(12) United States Patent
Caren

(10) Patent No.: US 6,870,458 B2
(45) Date of Patent: Mar. 22, 2005

(54) DEALER REMOTE TRANSMITTER WITH TIME LIMITED OPERABILITY

(75) Inventor: Barry L. Caren, Beverly Hills, CA (US)

(73) Assignee: Magnadyne Corporation, Compton, CA (US)

( * ) Notice: Subject to any disclaimer, the term of this patent is extended or adjusted under 35 U.S.C. 154(b) by 361 days.

(21) Appl. No.: 09/916,569

(22) Filed: Jul. 27, 2001

(65) Prior Publication Data

US 2003/0020601 A1 Jan. 30, 2003

(51) Int. Cl.[7] .................................................. G06F 7/00
(52) U.S. Cl. ................ 340/5.22; 340/5.28; 340/825.69; 307/10.3
(58) Field of Search ....................... 340/825.69, 825.72, 340/5.28, 5.22, 5.61, 5.64, 5.72; 307/10.4, 10.3, 10.6, 10.1

(56) References Cited

U.S. PATENT DOCUMENTS

| | | |
|---|---|---|
| 5,157,610 A * | 10/1992 | Asano et al. ................. 701/32 |
| 5,323,140 A | 6/1994 | Boyles |
| 5,479,156 A | 12/1995 | Jones |
| 5,563,579 A | 10/1996 | Carter |
| 5,602,535 A | 2/1997 | Boyles et al. |
| 5,635,693 A | 6/1997 | Benson et al. |
| 5,801,618 A | 9/1998 | Jenkins |
| 5,955,981 A * | 9/1999 | Rangan ...................... 341/173 |
| 6,029,102 A * | 2/2000 | Elsman .......................... 701/1 |

OTHER PUBLICATIONS

Model 7919P Silencer Security Systems Instruction Guide, pp. 1–8.

* cited by examiner

Primary Examiner—Michael Horabik
Assistant Examiner—M Shimizu
(74) Attorney, Agent, or Firm—Brooks Kushman P.C.

(57) ABSTRACT

A system and method for controlling remotely controlled components of a plurality of vehicles in response to a short range common signal emitted by a transmitter that can operate the components only during specified time periods. A transmitter can be programmed to provide a relatively long range customer signal that can operate the components at any time. The system and method are operative on a mutually exclusive basis wherein the remotely controlled components only respond to the common signal or the customer signal.

20 Claims, 3 Drawing Sheets

DEALER REMOTE TRANSMITTER WITH TIME LIMITED OPERABILITY

BACKGROUND OF THE INVENTION

1. Field of the Invention

This invention relates to remote systems for automotive dealerships, and particularly to a remote system for selectively arming/disarming vehicles.

2. Background Art

Automotive dealerships generally have a large number of vehicles for sale. Salesmen at dealerships are responsible for demonstrating vehicles to potential customers. For security the vehicles may be either locked or otherwise protected by an electronic security system. To demonstrate a vehicle to a potential customer, salesmen must be able to unlock the car and, if necessary, disarm the security system. Vehicle security systems are responsive to remote control signals that are generated by key fob transmitters that are matched to specific receivers for each vehicle's security system. Unfortunately, it is necessary for a salesman to have a transmitter for each vehicle to produce an appropriate remote control signal for each car. If customers wish to see several vehicles or become interested in a vehicle as they are touring the dealership lot, the salesman must carry several transmitters or return to the office for each vehicle to be demonstrated.

Some dealers avoid such problems by disabling or not arming the security systems. By doing so, the security of vehicles on the dealer's lot may be compromised during the time that the dealership is open. It is also necessary to lock and arm each vehicle at closing time to protect vehicles when the dealership is closed, or at other times when dealership employees are not authorized to access or start the vehicles.

If the security system is not armed when customers see a demonstration of a vehicle, they may not realize that the vehicle is equipped with a security system and the salesman may not demonstrate the system's features and ease of operation. If the security system is not demonstrated, customers will be less likely to purchase the security system with the vehicle.

Therefore, it would be beneficial to reduce the number of transmitters by having a common transmitter operable for controlling at least one component on any one desired vehicle on the lot. Secondly, it would be beneficial to enhance security by providing a transmitter that has a limited range so that only the vehicle nearest the transmitter is disarmed. Thirdly, it would be beneficial to further enhance security by prohibiting operation of the remotely controlled components during a programmable time period, for example, during the hours when the dealership personnel are not authorized to access the vehicles.

As such, and in response to the potential benefits noted above, there is a need for selectively controlling vehicle components according to selectable signal transmission range and that is programmable to limit the time period of operation in order to solve the problems identified above and other problems that will be apparent to one of ordinary skill in the art in view of the attached specification and drawings.

SUMMARY OF THE INVENTION

This invention provides a system for remotely controlling components of automotive vehicles only during selected time periods.

In one embodiment of the present invention, a system for remotely controlling components of a group of automotive vehicles is disclosed. The system includes a programmable transmitter that is operable to transmit a common signal capable of controlling at least one component of a vehicle. The transmitter may be adjusted to select a particular range in which the common signal is transmitted. The group of vehicles each include a receiver for receiving the common signal. The receiver then, in response to the common signal, directs control of the automotive component. The system also includes a programming source for programming the transmitter and/or the receiver to prohibit the transmission of the common signal during at least one programmable time period. Alternatively, the receiver or its associated control system may be programmed to prevent operation of the remotely controlled component during a certain time period.

According to one aspect of the present invention, the system for remotely controlling automotive components within vehicles may be programmed to prohibit employees from operating or accessing the vehicle during selectable times of day, for example, when the dealership is closed.

According to one aspect of the present invention, a remote transmitter may be adjusted to select a limited signal transmission range for the common signal that only affects vehicles that are within a desired degree of proximity to the transmitter. In one embodiment of the present invention, the selected signal transmission range may be within the range of four to six feet.

According to another aspect of the present invention, the system for remotely controlling components of a vehicle is a remote keyless entry (RKE) system. The transmitter may be a key fob and at least some of the remotely controlled components may be part of a vehicle security system. Further, the remotely transmitted signal may be capable of arming/disarming the security system. An additional feature that may be provided is a door lock that is operable with the security system, wherein the doors may be locked when the security system is armed and the doors may be unlocked when the security system is disarmed. Other remotely controlled components may include the starter, air conditioner, heater, windows or seat positioning systems. Demonstrating remote operations of such components fosters sales of the systems.

According to yet another aspect of the invention, the programming source may be a computer that is adapted to communicate with a programmable transmitter or receiver the time period of operation and lock-out. The computer is adapted to communicate a signal by a cable that may be connected to either a transmitter or a receiver, or both. The computer may also be adapted to communicate a signal by radio frequency that is received by either a transmitter or a receiver, or both. The computer for programming either the transmitter or the receiver may be located inside the dealership.

According to one mode of the present invention, when the system is programmed to respond to a customer signal, a vehicle having a controllable component will be only operable in response to the customer signal and will be unresponsive to the common signal.

The transmitter of the present invention comprises a programmable transmitter for transmitting a signal to a remote receiver during selected time periods. The transmitter includes an RF oscillator that transmits the signal. The content of the RF signal is based on a signal received from a programmable encoder. The encoder is programmable by a programming source to produce a customer or common signal by the RF oscillator. The control of the RF oscillator is controlled by a control switch that interacts with the oscillator to initiate signal transmission when the switch is actuated. The control of the RF oscillator is also controlled by a programmable interrupt that prohibits signal transmission during selected time periods even if the control switch is actuated. A battery powers the transmitter.

Another aspect of the transmitter of the present invention is that the oscillator may be adjusted to limit the range in which any one of the signals may be transmitted.

According to one method of practicing the present invention, a method is disclosed for arming/disarming vehicle security systems found on a number of vehicles in an automotive dealership. The security system is armed/disarmed in response to a programmable transmitter that transmits a common signal for arming/disarming any of the vehicles having the security system. The method also includes configuring a programmable receiver to receive the common signal and interactively communicate with the security system. The signal transmission range may be controlled so that only vehicles in a selected proximity to the transmitter receive the transmitted signal. Finally, a programming source is provided that generates a signal for programming either the transmitter or the receiver, or both, to prevent operation during at least one programmable period.

The above noted embodiments and unique aspects of the invention will be better understood in light of the following detailed description and attached drawings.

DETAILED DESCRIPTION OF THE PREFERRED EMBODIMENTS

Figure 1:
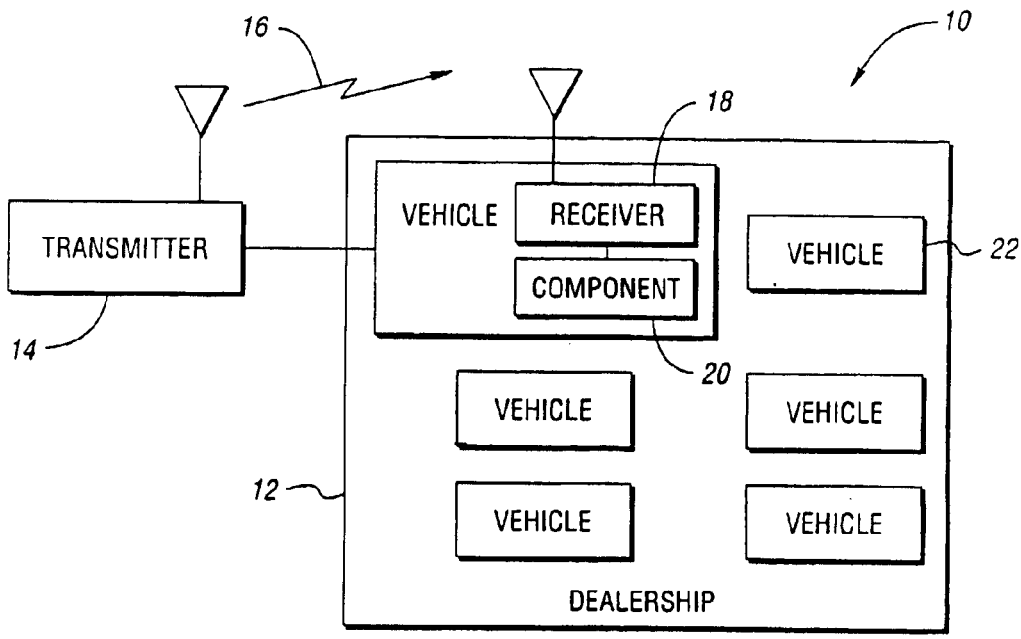
FIG. 1 is a block diagram of a remote system for an automotive dealership having a number of vehicles with remotely controlled components according to an embodiment of the present invention.

FIG. 1 is a block diagram of remote system 10 for automotive dealership 12. In operation, the system 10 becomes active when transmitter 14 communicates radio frequency signal ("RF signal") 16 to vehicle receiver 18, which then initiates control of at least one remotely controlled vehicle component 20 based on RF signal 16.

Dealership 12 includes a number of vehicles 22 spaced apart from one another in a typical parking lot spacing of four to six feet. Vehicle 22 is provided with the receiver 18 and at least one remotely controlled component 20. The remotely controlled component 20 may be a security system, door lock, lighting system, air conditioning system, vehicle seats, heating system, engine starter, or the like. At least one of the components 20 is responsive to RF signal 16.

Figure 2:
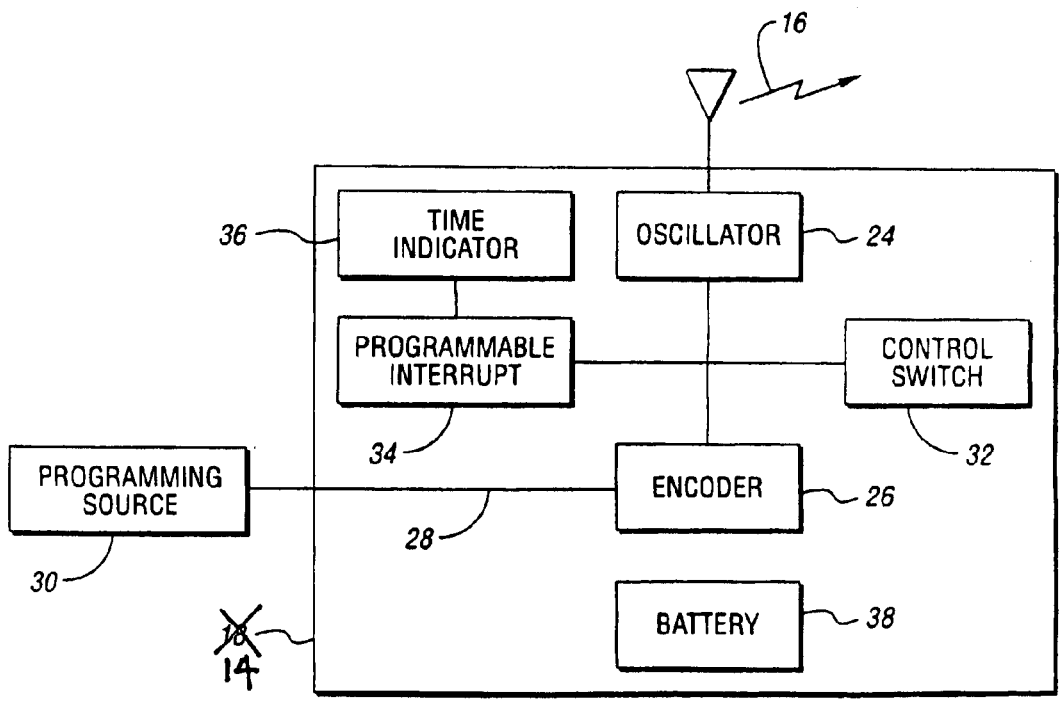
FIG. 2 is a block diagram of a programmable transmitter capable of transmitting a signal to a remote receiver according to an embodiment of the present invention.
Figure 3:
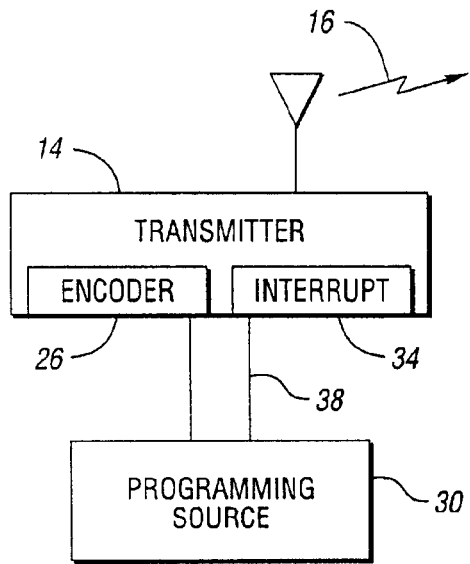
FIG. 3 is a block diagram of a transmitter receiving a programming signal from a computer programming source via a cable according to an embodiment of the present invention.

FIG. 2 is a block diagram of programmable transmitter 14 made according to one embodiment of the present invention. Transmitter 14 includes RF oscillator 24 for transmitting RF signal 16 at selectable signal ranges. The RF signal 16 may be either a common signal 16a or customer signal 16b. Generally, the signal range is controllable to be limited to a distance corresponding to dealership 12 parking lot spacing. The signal range is limited by controlling the signal power of RF oscillator 24. In this manner, RF signal 16 transmission may be limited to only affect vehicles 22 that are within a selectable proximity to the transmitter 14.

Encoder 26 programs RF oscillator 24 according to instructions contained in a programming signal 28. Programming source 30, which is typically a computer, provides and transmits programming signal 28. Programming source 30 is shown in the embodiment of FIG. 2 as being remote from transmitter 14, but the programming source could also be located on transmitter 14.

In response to programming signal 28, encoder 26 may be adjusted so that either the common signal 16a or customer signal 16b is transmitted by oscillator 24. Common signal 16a is a short range signal that serves as a master key for all vehicles on the dealership lot that are equipped with the system. Customer signal 16b is programmed when vehicle 22 is sold. When the customer signal 16b is enabled, transmitter 14 is disabled from transmitting common signal 16a. This mutually exclusive arrangement prevents transmitters programmed with a customer signal 16b from operating remotely controlled components on unsold vehicles 22 at dealership 12, and also prevents transmitters programmed with a common signal 16a from operating remotely controlled components on vehicles 14 after the sale.

Control switch 32, when actuated, causes oscillator 24 to transmit RF signal 16. Control switch 32 is typically actuated by depressing a button on the face of a key fob type remote transmitter 14. Control switch 32 may be programmed to prohibit signal transmission when the programmable interrupt 34 is activated. Typically, programmable interrupt 34 prohibits oscillator 24 from transmitting during programmable periods. Typically, such periods are those times during the day when dealership 12 is closed or at other times when the dealership's employees are not supposed to be able to access vehicles 20. Timer 36 is provided for monitoring the time of day. Programmable interrupt 34 is programmed in response to programming signal 28. Oscillator 24, encoder 26, programming source 30, control switch 32, and programmable interrupt 34, are all powered by battery 38.

Figure 4:
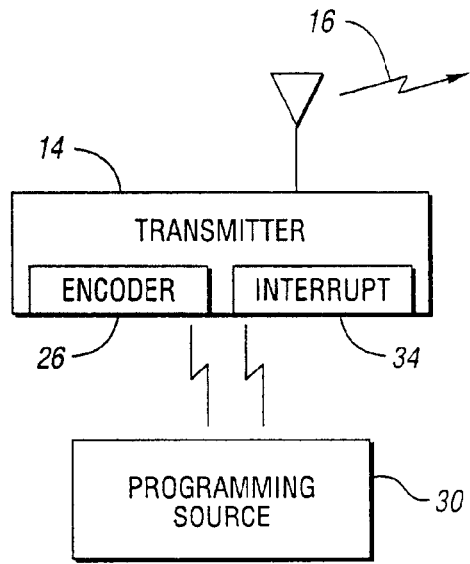
FIG. 4 is a block diagram of a transmitter receiving a programming signal from a computer programming source via a RF signal according to an embodiment of the present invention.

In the embodiment of the present invention illustrated in FIG. 4, programming signal 28 is communicated from computer 32 to interrupt 36 and encoder 26 by cable 40.

Figure 5:
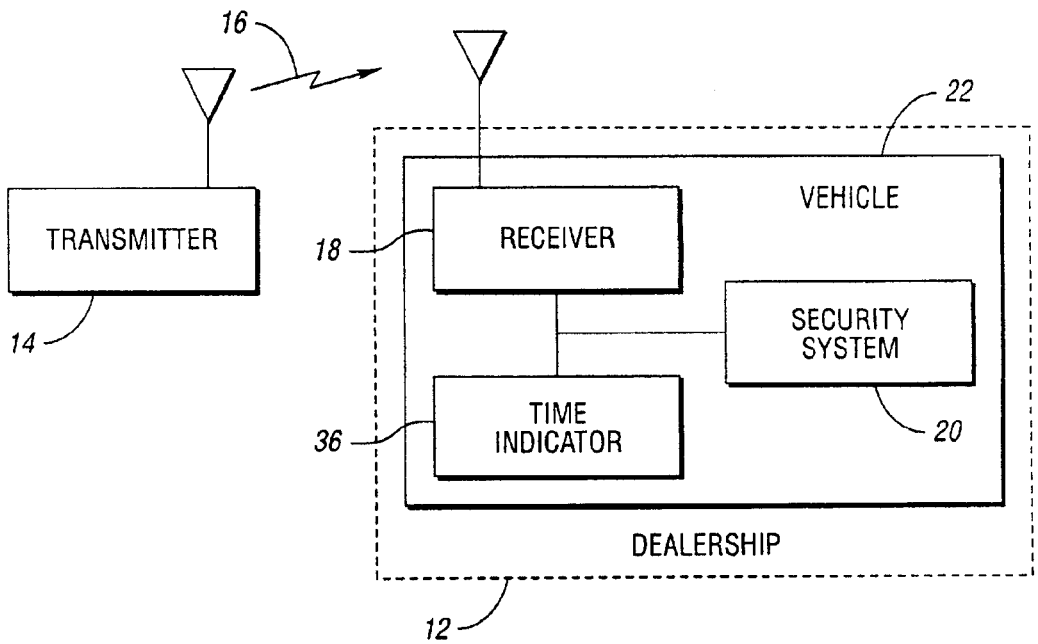
FIG. 5 is a block diagram of a remote keyless entry (RKE) system for arming/disarming a vehicle at a automotive dealership according to an embodiment of the present invention.

In the embodiment of the present invention illustrated in FIG. 5, signal 28 is communicated from computer 32 to interrupt 36 and encoder 26 by is a digital bit stream transmitted over a radio frequency link.

Vehicles 22 are either provided with a programmable receiver 18 as original equipment or may be retrofitted with the receiver 18. Receiver 18 may be set to receive either type of RF signal 16a or 16b. Upon receiving one of the signals 16a or 16b, the system functions to control at least one component 20.

In the embodiment of the present invention shown in FIG. 5, component 20 is a vehicle security system that is controlled by RF signal 16. Vehicle security system 20 usually arms/disarms vehicle 22. When vehicle 22 is armed, the system generally locks the vehicle doors and when vehicle 22 is disarmed the system generally unlocks the vehicle doors. Additionally, security system 20 may include a kill switch (not shown) to inhibit starting the vehicle 22 unless the appropriate RF signal 16 is received.

Figures 6, 7:
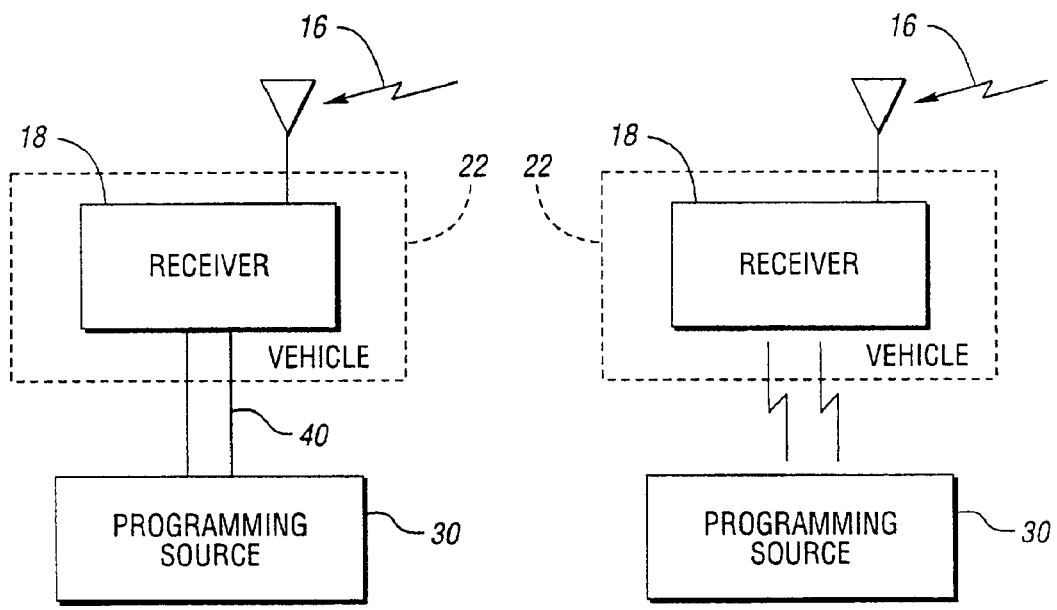
FIG. 6 is a block diagram of a receiver receiving a programming signal from a computer programming source via a cable according to an embodiment of the present invention.
FIG. 7 is a block diagram of a receiver receiving a programming signal from a computer programming source via a RF signals according to an embodiment of the present invention.

In the embodiments of the present invention shown in FIGS. 6 and 7, receiver 18, like transmitter 14, receives programing signal 28 by cable 38 or by RF signaling. In response to programming signal 28 and timer 36, receiver 18 may be programmed to prohibit control of component 20 during times when the dealership employees are not authorized to access vehicles 22. Programming signal 28 also functions to set the type of signal 16a or 16b that receiver 18 requires to control component 20.

Figure 8:
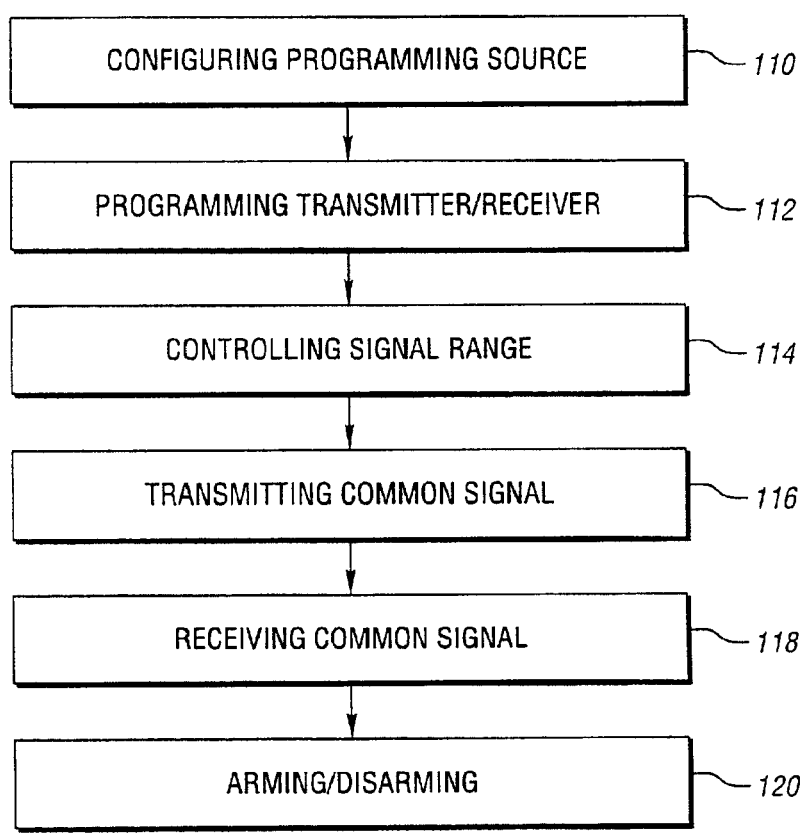
FIG. 8 is a block diagram for programming a system for arming/disarming a vehicle according to an embodiment of the present invention.

FIG. 8 illustrates a flow diagram of a method for arming/disarming vehicle 22 according to one embodiment of the present invention when the system is in the dealership and responsive to common signal 16a. Generally, at step 110 programing source 30 is configured to communicate programming signal 28. At step 112, transmitter 14 or receiver 18 are programmed in response to signal 28. At step 114, the range in which oscillator 24 transmits signal 16a may be controlled by a number of methods. Typically, the power level of transmitter 14 is adjusted by analog or digital controls so that only vehicle 22 nearest in proximity to transmitter 18 receives common RF signal 16a. At step 116, oscillator 24 transmits the RF signal 16a to nearest vehicle 22. At step 118, vehicle 22 receives signal 16a so that security system 20 may arm/disarm vehicle 22 at step 120 if the dealership is open. When the system is in the customer or customer signal mode 16b, the transmitter 14 or receiver 18 are again programmed in response to signal 28. The oscillator 24 is set to the maximum allowed RF signal range but the signal transmitted is only effective for the remotely controlled component 20 on the vehicle sold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A remote system for an automotive dealership having a number of vehicles with remotely controlled components, the system comprising:
    a programmable transmitter module disposed apart from a vehicle for transmitting a common signal for controlling at least one remotely controlled component on at least one vehicle, the programmable transmitter module being adjustable to select a signal transmission range;
    a receiver associated with each vehicle for receiving the common signal and adapted to control operation of the at least one component; and
    a programming source disposed apart from the programmable transmitter module and the receiver for generating a programming signal for programming the programmable transmitter module, wherein the programming signal inhibits operation of the remotely controlled component during at least one programmable period corresponding to a period of time in which the automotive dealership is closed.

2. The system of claim 1, wherein the selectable signal transmission range is sufficiently limited to only reach the receiver in the vehicle nearest the programmable transmitter module.

3. The system of claim 1, wherein the signal transmission range is in the range of between four to six feet.

4. The system of claim 1, wherein the remote system is a remote keyless entry system.

5. The system of claim 1, wherein at least one of the remotely controlled components is a vehicle security system.

6. The system of claim 5, wherein the common signal is capable of aiming/disarming the vehicle security system.

7. The system of claim 5, further comprising a door lock that operates in conjunction with the vehicle security system, wherein the door is locked when the vehicle security system is armed and the door is unlocked when the vehicle security system is disarmed.

8. The system of claim 1, wherein the programming source is a computer that is adapted to provide the programming signal.

9. The system of claim 8, wherein the computer is adapted to communicate the programming signal by a cable connected to the programmable transmitter module.

10. The system of claim 8, wherein the computer is adapted to communicate the programming signal by a radio frequency received by the programmable transmitter module.

11. The system of claim 8, wherein the programming signal is a digital bit stream transmitted over a radio frequency link.

12. The system of claim 1, wherein the at least one programmable period corresponds to a time of day when employees are not supposed to access the vehicle.

13. The system of claim 1, wherein the at least one programmable period corresponds to a time of day specified by an operator.

14. The system of claim 1, wherein the programming source programs the programmable transmitter module to transmit a customer signal, wherein the at least one component on only one vehicle is operable in response to the customer signal but is not responsive to the common signal when the customer signal is programmed.

15. A system for remotely controlling operation of a component of a motor vehicle, the system comprising:
    a programming device disposed apart from the motor vehicle and adapted to provide a first control signal;
    a transmitter module adapted to receive the first control signal and disposed apart from the programming device, the transmitter module including:
        a control switch through which a user can enter a command;
        an oscillator adapted to transmit a second control signal based on the command;
        a programmable encoder for programming the second control signal transmitted by the oscillator; and
        a battery for providing power to the control switch and the oscillator; and
    a receiver adapted to receive the second control signal and adapted to control operation of the component;
    wherein the first control signal is configured to inhibit the oscillator from transmitting the second control signal during specified periods of a time of day.

16. The system of claim 15, wherein the oscillator is adjustable to select a signal transmission range.

17. The system of claim 15, wherein the transmitter module is adapted to receive a signal for programming the specified periods via a radio frequency link.

18. The system of claim 15, wherein the encoder is adapted to receive a signal for directing the oscillator to transmit a customer signal or a common signal.

19. A method for controlling operation of a remote control system for a motor vehicle, the remote control system including a programming device, a transmitter module disposed apart from and adapted to communicate with the programming device, and a receiver adapted to communicate with the transmitter module and control operation of the motor vehicle, the method comprising:

establishing a time period with the programming device;

communicating a signal based on the time period to the transmitter module; and inhibiting operation of the transmitter module for a period of time based on the signal.

20. The method of claim 19, wherein the period of time corresponds to a time of day when an employee is not supposed to access the motor vehicle.

* * * * *